UNITED STATES PATENT OFFICE.

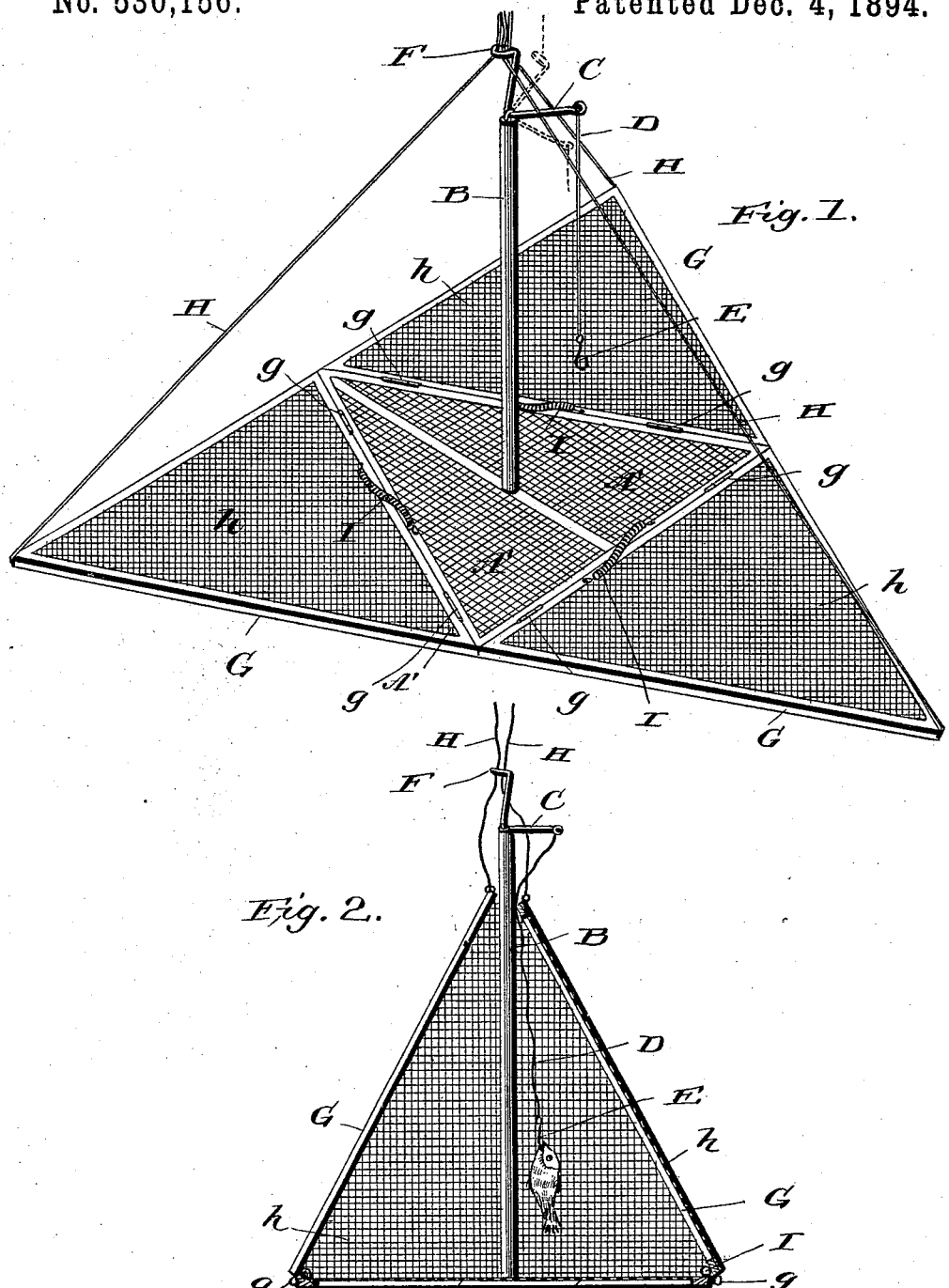

MELCHIOR E. BECKER AND RICHARD LIND, OF WILMINGTON, DELAWARE.

FISH OR CRAB NET.

SPECIFICATION forming part of Letters Patent No. 530,156, dated December 4, 1894.

Application filed July 27, 1894. Serial No. 518,725. (No model.)

*To all whom it may concern:*

Be it known that we, MELCHIOR E. BECKER and RICHARD LIND, citizens of the United States, residing at Wilmington, in the county of New Castle, State of Delaware, have invented certain new and useful Improvements in Fish or Crab Nets, of which the following is a specification, reference being had therein to the accompanying drawings.

This invention relates to certain new and useful improvements in fish and crab nets of that class in which the net is caused to fold to retain the fish and to lie flat upon the bottom of the river when set.

It has for its objects among others to provide a simple and cheap improved net of this character which shall be positive in its action and which is provided with a central staff upon which is pivoted a lever to which the bait is attached and through a loop of which pass the lines which are connected to the corners of the folding sections.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a perspective view showing the net in its open position. Fig. 2 is a view partly in section and partly in elevation, showing the net closed.

Like letters of reference indicate like parts in both of the views.

Referring now to the details of the drawings by letter, A designates the central or body portion of the net which is triangular in form as seen in Fig. 1, having preferably a plate or strip A' extending from one apex to the center of the side opposite the same, and to this strip or plate is secured and from which rises the staff or pole B, which should be of a height somewhat greater than the height of the net when closed as shown best in Fig. 2.

C is a lever pivoted upon the upper end of the staff or pole B, the horizontal arm of the lever having connected therewith the line D carrying the hook E to which the bait is to be affixed in the usual manner. The vertical arm of this lever is formed into or provided with a loop or eye F through which pass the lines which are connected with the folding portions of the net as will soon be described.

G are three triangular sections which are hinged to the three sides of the central or body portion by suitable hinges g, and to the outer corners of these folding sections are connected the lines H all of which pass through the loop or eye F and extend upward and are designed to be held by the party in the boat or upon the wharf. The central portion as well as the folding sections are covered with netting or other suitable material as shown at h, as seen in both views.

I are springs connected with the central section and with the folding sections as shown in Fig. 1 and are constructed and arranged to normally hold the folding sections in their open position as seen in Fig. 1.

The manner of use will be readily understood. The net is lowered into the water, the outer sections being flat as shown and is in this position upon the bottom of the river. When a fish or crab or lobster bites at the bait it pulls the lever into the position indicated by dotted lines in Fig. 1, which pulls upon the lines H and thus notifies the fisherman that he has a bite. He at once pulls upon the lines H which close the net and the fish is caught.

Modifications in detail may be resorted to without departing from the spirit of the invention or sacrificing any of its advantages.

What is claimed as new is—

1. A fish or crab net composed of a triangular body portion, and triangular sections hinged to the sides of the body portion, and lines connected with the outer points of the hinged sections, substantially as specified.

2. The combination with the body portion and a staff thereon, of a lever pivoted on the staff and folding sections hinged to the body portion and having lines, as set forth.

3. The combination with the body portion and the staff, of the lever pivoted on the upper end of the staff, the hinged sections, and the lines connected with the outer points thereof and passed through a loop on the lever, as set forth.

4. The combination with the triangular body portion, of the triangular sections hinged thereto, the lever pivoted on the upper end of a staff on the body portion and formed with a loop, a line connected with the lever and designed to carry the bait, and the lines connected with the outer points of the hinged sections and passed loosely through the loop of the lever, substantially as specified.

5. The combination with the body portion and the staff rising therefrom, of the sections hinged to the body portion, the springs on the said body portion and sections, the lever pivoted on the upper end of the staff and having a loop, and the lines connected with the outer points of the hinged sections and passed loosely through the loop of the lever, as set forth.

In testimony whereof we affix our signatures in presence of two witnesses.

MELCHIOR E. BECKER.
RICHARD LIND.

Witnesses:
SAMUEL W. NEELD,
CHRISTIAN STROBEL.